(12) United States Patent
Zeng et al.

(10) Patent No.: US 11,902,047 B2
(45) Date of Patent: Feb. 13, 2024

(54) VIRTUAL INTRANET ACCELERATION METHOD AND SYSTEM, CONFIGURATION METHOD, STORAGE MEDIUM, AND COMPUTER APPARATUS

(71) Applicant: GUIZHOU BAISHANCLOUD TECHNOLOGY CO., LTD., Guiyang (CN)

(72) Inventors: Dongfang Zeng, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 328 days.

(21) Appl. No.: 17/298,447

(22) PCT Filed: Nov. 28, 2019

(86) PCT No.: PCT/CN2019/121705
§ 371 (c)(1),
(2) Date: May 28, 2021

(87) PCT Pub. No.: WO2020/108578
PCT Pub. Date: Jun. 4, 2020

(65) Prior Publication Data
US 2022/0109588 A1    Apr. 7, 2022

(30) Foreign Application Priority Data
Nov. 30, 2018    (CN) .......................... 201811459242.1

(51) Int. Cl.
*H04L 12/28*    (2006.01)
*H04L 12/46*    (2006.01)
*H04L 69/163*    (2022.01)

(52) U.S. Cl.
CPC ...... *H04L 12/2865* (2013.01); *H04L 12/2859* (2013.01); *H04L 12/2898* (2013.01); *H04L 12/4633* (2013.01); *H04L 69/163* (2013.01)

(58) Field of Classification Search
CPC ............. H04L 12/2865; H04L 12/2859; H04L 12/2898; H04L 12/4633; H04L 69/163; H04L 12/4641; H04L 41/083
See application file for complete search history.

(56) References Cited

U.S. PATENT DOCUMENTS 8,843,622 B1 * 9/2014 Graham ................. H04L 67/54
709/224
2010/0098092 A1    4/2010 Luo et al.
(Continued)

FOREIGN PATENT DOCUMENTS

CN    101217441 A    7/2008
CN    101778126 A    7/2010
(Continued)

OTHER PUBLICATIONS

World Intellectual Property Organization (WIPO) International Search Report for PCT/CN2019/121705 dated Feb. 2020 6 Pages.
(Continued)

*Primary Examiner* — Dady Chery
(74) *Attorney, Agent, or Firm* — ANOVA LAW GROUP, PLLC (57) ABSTRACT

A virtual Intranet acceleration method includes, upon receiving a TCP request from a server at an initiating end to be sent to a server at a receiving end, customer premise equipment CPE at the initiating end transmitting information of the TCP request to CPE at the receiving end, the CPE at the receiving end configuring a connection link between the server at the initiating end and the server at the receiving end according to the information of the TCP request, and trans-
(Continued)

mitting at least one of the TCP request or TCP response data through the connection link.

15 Claims, 4 Drawing Sheets

(56) References Cited

U.S. PATENT DOCUMENTS

| | | | | |
|---|---|---|---|---|
| 2014/0181267 | A1* | 6/2014 | Wadkins | ............... H04L 69/163 |
| | | | | 709/219 |
| 2015/0244580 | A1 | 8/2015 | Saavedra | |
| 2016/0006672 | A1 | 1/2016 | Saavedra et al. | |
| 2016/0191672 | A1* | 6/2016 | Perlman | ............... H04L 12/4633 |
| | | | | 370/474 |

FOREIGN PATENT DOCUMENTS

| | | | |
|---|---|---|---|
| CN | 103236964 | A | 8/2013 |
| CN | 103379130 | A | 10/2013 |
| CN | 104184749 | A | 12/2014 |
| CN | 104539531 | A | 4/2015 |
| CN | 104734893 | A | 6/2015 |
| CN | 105874744 | A | 8/2016 |
| CN | 106713100 | A | 5/2017 |
| CN | 107454276 | A | 12/2017 |
| CN | 107659673 | A | 2/2018 |
| CN | 108234165 | A | 6/2018 |
| WO | 2017055122 | A1 | 4/2017 |

OTHER PUBLICATIONS

China National Intellectual Property Administration (CNIPA) First Office Action and Search Report for CN201811459242.1 dated Nov. 1, 2020, 2020 11 Pages (with translation).
He et al., Efficient Hashing Technique Based on Bloom Filter for High-Speed Network, 2016 8th International Conference on Intelligent Human-Machine Systems and Cybernetics, DOI 10.1109/IHMSC.2016.94, pp. 58-63, Aug. 28, 2016.
India Intellectual Property Patent Office Examination Report for Application No. 202127023569 dated May 26, 2022 5 Pages.
Intellectual Property Office of Singapore The Office Action for Application No. 11202105791W dated Sep. 19, 2022 9 pages.

* cited by examiner

VIRTUAL INTRANET ACCELERATION METHOD AND SYSTEM, CONFIGURATION METHOD, STORAGE MEDIUM, AND COMPUTER APPARATUS

CROSS-REFERENCE TO RELATED APPLICATIONS

The present application is a national stage entry under 35 U.S.C. § 371 of International Application No. PCT/CN2019/121705, filed Nov. 28, 2019, which claims priority to Chinese Patent Application No. 201811459242.1, filed to the CNIPA on Nov. 30, 2018, titled "Virtual Intranet Acceleration Method and System, and Computer Apparatus," the entire contents of both of which are incorporated herein by reference.

TECHNICAL FIELD

The present application relates to the field of Software-Defined Wide Area Network (SD-WAN), and in particular to a virtual Intranet acceleration method and system, a configuration method, a storage medium, and a computer apparatus.

BACKGROUND

A conventional large enterprise usually has many subsidiaries or branches nationwide. Branches are typically large in scale and mainly undertake regional localization functions, with a dedicated IT department responsible for network management and operation, and provide independent services. The headquarters needs to access the services of the branches, while the branches also need to access the services of the headquarters. In the era of Internet cloud, enterprises will also use mass cloud services, purchase cloud computer room, and access services in the cloud computer room. For security and management convenience, enterprises usually adopt network technologies to achieve Intranet interconnection among their headquarters, branches and cloud computer rooms for mutual access to Intranet services.

Figure 1:
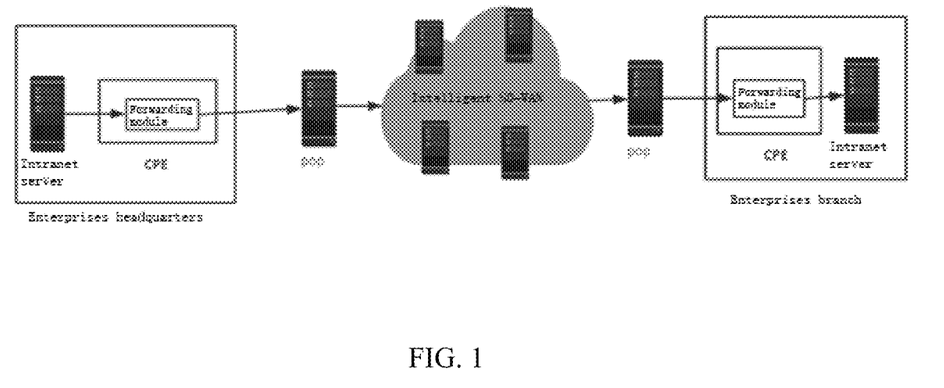
FIG. 1 is a schematic diagram of a basic SD-WAN architecture according to an exemplary embodiment.

Due to the high cost of direct deployment of private lines and the fact that the link stability cannot be guaranteed by using Virtual Private Network (VPN), most enterprises will purchase SD-WAN products to implement the interconnection between the branch and cloud computer room, wherein the branch interconnection will be described in details. Intranet interconnection between branches, with a basic architecture shown in FIG. 1, is implemented by deploying customer premise equipment (CPE), and the data exchanged between the Intranets are transmitted in an accelerated manner through a SD-WAN dynamic link, which may meet the needs of enterprises well in most cases.

At present, the common way to prevent packet loss during transmission is to transmit the same data packet in multiple copies, so as to minimize the probability of packet loss. For example, a Transmission Control Protocol (TCP) packet from an Intranet user is transmitted in two or three copies of the same data in an SD-WAN Intranet through different paths. Transmission in multiple copies takes up different paths, which will increase the consumption of network resources in the case of mass data to be transmitted, and packet loss cannot be completely avoided.

SUMMARY

To overcome the problems in related technologies, the present application provides a virtual Intranet VPN acceleration method and system, a configuration method, a storage medium, and a computer apparatus.

A first aspect of the present application provides a virtual Intranet acceleration method, comprising:

upon receiving a TCP request sent from a server at an initiating end to a server at a receiving end, customer premise equipment CPE at the initiating end transmitting information of the TCP request to CPE at the receiving end;

the CPE at the receiving end configuring a connection link between the server at the initiating end and the server at the receiving end according to the information of the TCP request; and transmitting the TCP request and/or TCP response data through the connection link.

Wherein, upon receiving a TCP request sent from a server at an initiating end to a server at a receiving end, CPE at the initiating end transmitting information of the TCP request to CPE at the receiving end comprises:

the CPE at the initiating end detecting the TCP request; and the CPE at the initiating end encapsulating the information of the TCP request sent from a server at a branch with a private protocol, and then sending the encapsulated information to the CPE at the receiving end through a port corresponding to the TCP request; the information of the TCP request at least contains following information:

request data, an IP and a plurality of ports of the server at the receiving end configured as a Destination, and an IP and a plurality of ports of the server at the initiating end configured as a Source of the request.

Wherein, the CPE at the initiating end transmits the information of the TCP request to the CPE at the receiving end through a reliable Software-Defined Wide Area Network SD-WAN transmission mode.

Wherein, the CPE at the receiving end configuring the connection link according to the information of the TCP request comprises:

the CPE at the receiving end parsing the information of the TCP request with the private protocol upon receiving the information of the TCP request;

initiating a connection to the IP and ports of the server at the receiving end, and configuring the IP and ports of the server at the receiving end as the Destination end;

configuring the IP and ports of the server at the initiating end as the Source end; and establishing the connection link between the Destination end and the Source end.

Wherein, the server at the initiating end is a server at a branch, and the server at the receiving end is a server at a headquarters; or the server at the initiating end is the server at the headquarters, and the server at the receiving end is the server at the branch.

According to another aspect of the present application, a configuration method for configuring an SD-WAN connection link between a server at a receiving end and a server at an initiating end, wherein, customer premise equipment (CPE) at the receiving end receives information of a TCP request which is encapsulated with a private protocol and sent from CPE at the initiating end, and parses the information of the TCP request with the private protocol;

the CPE at the receiving end initiates a connection to an IP and a plurality of ports of the server at the receiving end and configures the IP and the ports of the server at the receiving end as a Destination end;

the CPE at the receiving end configures an IP and a plurality of ports of the server at the initiating end as a Source end; and the CPE of the receiving end establishes a connection link between the Destination end and the Source end.

According to another aspect of the present application, a virtual Intranet acceleration system, at least comprising a server at an initiating end, a server at a receiving end, customer premise equipment CPE at the initiating end and customer premise equipment CPE at the receiving end, which are connected through a Software-Defined Wide Area Network SD-WAN;

the CPE at the initiating end is configured to, upon receiving a TCP request sent from the server at the initiating end to the server at the receiving end, transmit information of the TCP request to the CPE at the receiving end;

the CPE at the receiving end is configured to configure a connection link between the server at the initiating end and the server at the receiving end according to the information of the TCP request; and the server at the initiating end and the server at the receiving end are configured to transmit the TCP request and/or TCP response data through the connection link.

Wherein, the CPE at the initiating end is configured to detect the TCP request;

the CPE at the initiating end is configured to encapsulate the information of the TCP request sent from a server at a branch with a private protocol, and then send the encapsulated information to the CPE at the receiving end through a port corresponding to the TCP request; the information of the TCP request at least contains following information:

request data, an IP and a plurality of ports of the server at the receiving end configured as a Destination, and an IP and a plurality of ports of the server at the initiating end configured as the Source of the request.

Wherein, the connection link is carried on an SD-WAN reliable transmission channel between the CPE at the initiating end and the CPE at the receiving end.

Wherein, the CPE at the receiving end is configured to parse the information of the TCP request with the private protocol upon receiving the information of the TCP request; initiate a connection to the IP and the ports of the server at the receiving end, and configure the IP and the ports of the server at the receiving end as the Destination end; configure the IP and the ports of the server at the initiating end as the Source end; and establish the connection link between the Destination end and the Source end.

According to another aspect of the present application, a computer-readable storage medium in which a computer program is stored is provided. The steps of the above method for accelerating the virtual Intranet are implemented when the computer program is executed by the processor.

According to another aspect of the present application, a computer apparatus is provided, including a processor, a memory and a computer program stored in the memory, the steps of the above method for accelerating the virtual Intranet being implemented when the computer program is executed by the processor.

With the present application, the transparency and acceleration of the TCP connection between the initiating end and the receiving end is achieved, and the transmission through the TCP connection is accelerated, which effectively avoids the packet loss and solves the problems of large resource consumption and poor effect of existing packet loss prevention methods.

BRIEF DESCRIPTION OF THE DRAWINGS

The accompanying drawings, which constitute a part of the present application, are included to provide a further understanding of the present application. The exemplary embodiments of the present application and description thereof herein are only for explaining the present application, but not for unduly limiting the present application. In Figures.

DETAILED DESCRIPTION OF THE EMBODIMENTS

In order to make objectives, technical schemes and advantages of the embodiments of the present application clearer, the technical schemes in the embodiments of the present application will be clearly and completely described as below with reference to the accompanying drawings in the embodiments of the present application. Obviously, the described embodiments are a part of, not all of, the embodiments of the present application. All other embodiments obtained by those of ordinary skill in the art based on the embodiments of the present application without paying any creative effort shall fall into the protection scope of the present application. It should be noted that the embodiments of the present application and the features in the embodiments can be arbitrarily combined with each other in the case of no conflict.

At present, the common way to prevent packet loss during transmission is to transmit the same data packet in multiple copies, so as to minimize the probability of packet loss. For example, a TCP packet from an Intranet user is transmitted in two or three copies of the same data in an SD-WAN Intranet through different paths. Transmission in multiple copies takes up different paths, which will increase the consumption of network resources in the case of mass data to be transmitted, and packet loss cannot be completely avoided.

To solve the above problems, embodiments of the present application provides a virtual Intranet acceleration method and system, a configuration method, a storage medium, and computer apparatus.

Figure 2:
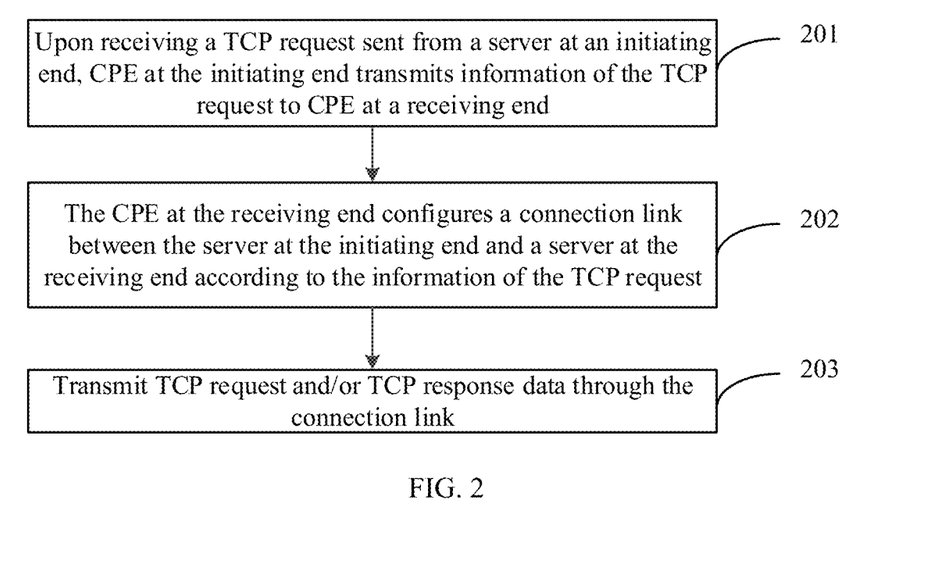
FIG. 2 is a flowchart of a virtual Intranet acceleration method according to an exemplary embodiment.

An embodiment of the present application provides a virtual Intranet acceleration method. As shown in FIG. 2, a process of completing data transmission through the SD-WAN by using the method includes following steps.

In step 201, upon receiving a TCP request sent from a server at an initiating end, customer premise equipment (CPE) at the initiating end transmits information of the TCP request to CPE at a receiving end.

In step 202, the CPE at the receiving end configures a connection link between the server at the initiating end and a server at the receiving end according to the information of the TCP request.

In step 203, the TCP request and/or TCP response data is transmitted between a Source end and a Destination end through the connection link.

In the embodiment of the present application, the initiating end at least includes the server and the CPE. The receiving end at least includes the server and the CPE.

The server at the initiating end may be the server at a branch, and the server at the receiving end may be the server at the headquarters.

Or, the server at the initiating end is the server at the headquarters, and the server at the receiving end is the server at the branch.

Figure 3:
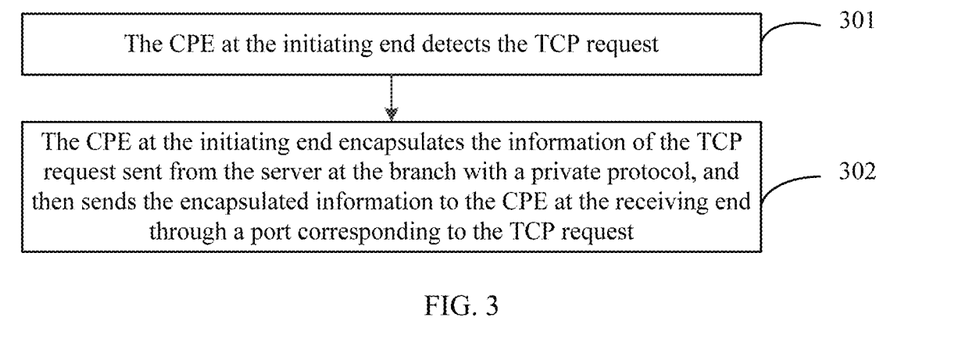
FIG. 3 is a specific flowchart of step 201 in the flowchart of FIG. 2.

Wherein, if the server at the initiating end is the server at the branch, and the server at the receiving end is the server at the headquarters. As shown in FIG. 3, step 201 may be performed in steps 301 to 302 as below.

In step 301, the CPE at the initiating end detects the TCP request.

In step 302, the CPE at the initiating end encapsulates the information of the TCP request sent from the server at the branch with a private protocol, and then sends the encapsulated information to the CPE at the receiving end through a port corresponding to the TCP request.

Wherein, in the present application, the information of the TCP request at least contains following information:

request data, an IP and a plurality of ports of the server at the receiving end configured as the Destination the request, and an IP and a plurality of ports of the server at the initiating end configured as the Source of the request.

In the present application, the port corresponding to the TCP request refers to a port assigned in advance to a user who initiated the TCP request. That is, corresponding ports may be assigned in advance to different users to transmit the data requested by the users. The user initiating the TCP request may be either an individual user or a business service provider.

While sending data to the CPE at the receiving end, the CPE at the initiating end may transmit the information of the TCP request to the CPE at the receiving end through a reliable SD-WAN transmission mode.

Wherein, in the embodiment of the present application, the CPE at the initiating end and the CPE at the receiving end may also transmit non-TCP data through the reliable SD-WAN transmission mode.

Figure 4:
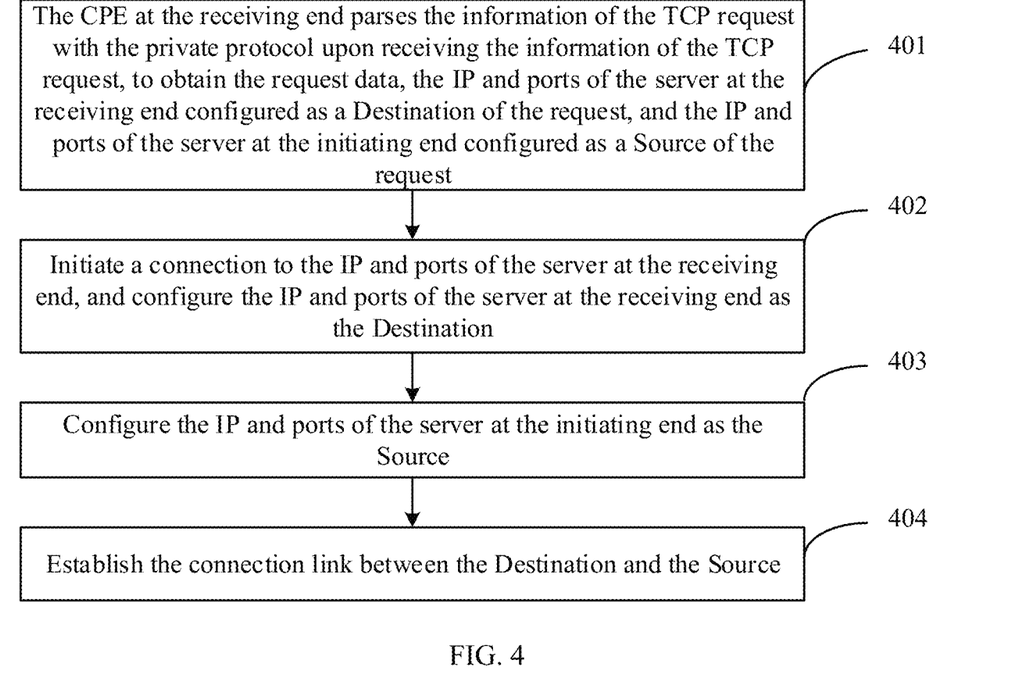
FIG. 4 is a specific flowchart of step 202 in the flowchart of FIG. 3.

As shown in FIG. 4, step 202 may be performed in steps 401 to 404 as below.

In step 401, the CPE at the receiving end parses the information of the TCP request with the private protocol upon receiving the TCP request, to obtain the request data, the IP and ports of the server at the receiving end configured as the Destination of the request, and the IP and ports of the server at the initiating end configured as the Source of the request.

In step 402, a connection is initiated to the obtained IP and ports of the server at the receiving end, and the IP and ports of the server at the receiving end are configured as the Destination end.

In step 403, the IP and ports of the server at the initiating end are configured as the Source end.

In step 404, the connection link is established between the Destination end and the Source end.

All packets transmitted through an SD-WAN virtual network channel are IP packets, which are mainly divided into UDP and TCP, wherein, UDP is a connectionless mode, and TCP is a reliable connection-based transmission mode. The packets lost during transmission will be retransmitted to ensure reliable transmission in TCP mode.

To ensure that there is no TCP over TCP problem, the underlying SD-WAN transmission is usually done using normal UDP transmission, without using reliable transmission. If the SD-WAN detects a POP and determines that packet loss occurs, it will switch to another link of a better communication quality using a dynamic route switching function. In this way, the TCP connection of the Intranet user may detect transient packet loss, and initiate retransmission by TCP connection of the user after packet loss occurs. In addition, the UDP connection of the Intranet user may also experience packet loss during transmission. In this case, manual retransmission may be required for the Intranet user.

The virtual Intranet acceleration method provided by the embodiment of the present application enables efficient and reliable transmission of TCP and non-TCP packets, thus successfully eliminating the impact of network jitter on transmission, greatly saving network resources and improving user experience.

An embodiment of the present application also provides a virtual Intranet communication method, which may solve the problem of packet loss during virtual channel transmission in case of network jitter.

In this embodiment of the present application, TCP transparent transmission may be implemented using a transparent proxy. Between two sub-networks, an SD-WAN implements transmission acceleration and avoids packet loss through a reliable transmission mode.

Figure 5:
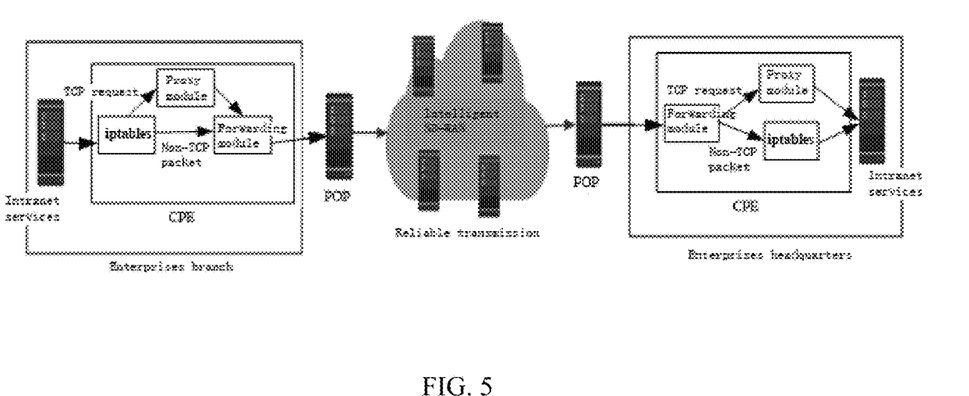
FIG. 5 is a schematic diagram of the implementation of the virtual Intranet acceleration method according to an exemplary embodiment.

The virtual Intranet communication process is described below by taking a process of requesting and responding from a conventional Intranet at a branch to an Intranet at the headquarters, and the principle thereof is shown in FIG. 5.

When a server at the branch shown in FIG. 5 initiates a TCP request to a server at the headquarters, the TCP request is forwarded to CPE at the branch which forwards the request data to a port corresponding to the TCP request through iptables forwarding, to implement the transparent proxy.

In the embodiment of the present application, the CPE includes iptables, a proxy module and a forwarding module. All requests from the server at the branch will be transmitted to the iptables of the CPE and then filtered and divided into TCP requests and non-TCP requests by the iptables, and the TCP requests will be transmitted through the proxy module and then forwarded to the headquarters through the forwarding module.

Wherein, the CPE at the branch obtains request data, an IP and a plurality of ports of the server at the headquarters configured as a Destination of the request, and an IP and a plurality of ports of the server at the branch configured as a Source of the request. The information is encapsulated with a private protocol and then forwarded to the SD-WAN.

The SD-WAN quickly transmits the received data to the CPE at the headquarters through reliable transmission modes (such as TCP and reliable UDP).

The CPE at the headquarters parses the private protocol to obtain the request data, the IP and the ports of the Destination of the request, the IP and the ports of the Source of the request, and initiates a connection to the IP and the ports of the Destination to implement Source address and Destination address masquerading through TCP parameters supported by the system. For example, an ip_transparent option of socket may be adopted to configure the IP and the ports of the Source of the request as the IP address and the ports connected to the Source. In this way, the client IP and ports shown to the destination server at the headquarters are the address of the server at the branch. Generally, specialized processing is not required for the non-TCP requests.

Subsequent request and response data may be transmitted in the connection link used to transmit the above data, thus accelerating TCP request transmission.

It can be seen from the above that, compared with the multi-copy transmission schemes in related technologies, which waste a large amount of bandwidth and cannot fundamentally solve the problem of network jitter and packet loss, the technical scheme provided by the embodiment of the present application may preferentially solve the problem of accelerating TCP connection transmission in a way that is imperceptible to customers, and may solve the problem of packet loss caused by network jitter.

For the process of establishing the connection link for request and response from the Intranet at the headquarters to the Intranet at the branch, its implementation principle is the same as the above principle, except that direction of the data transmission is opposite to that shown in FIG. 5, which will not be repeated in the embodiment of the present application.

An embodiment of the present application provides a configuration method for configuring an SD-WAN connection link between a server at a receiving end and a server at an initiating end, wherein it includes following steps.

A CPE at the receiving end receives information of a TCP request which is encapsulated with a private protocol and sent from CPE at the initiating end, and parses the information of the TCP request with the private protocol.

The CPE at the receiving end initiates a connection to an IP and a plurality of ports of the server at the receiving end, and configures the IP and ports as a Destination end.

The CPE at the receiving end configures an IP and a plurality of ports of the server at the initiating end as a Source end.

The CPE of the receiving end establishes a connection link between the Destination end and the Source end.

Wherein, the information of the TCP request at least contains following information:

request data, an IP and a plurality of ports of the server at the receiving end configured as the Destination of the request, and an IP and a plurality of ports of the server at the initiating end configured as the Source of the request.

In practice, the configuration method provided by this embodiment may be performed with reference to step 202 of the virtual Intranet acceleration method shown in FIG. 4, will not be repeated herein.

Figure 6:
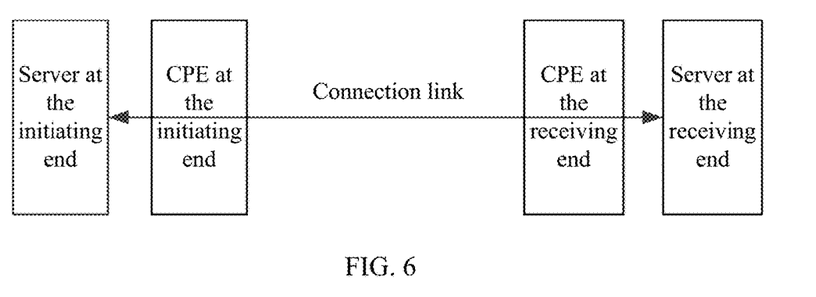
FIG. 6 is an architecture block diagram of a virtual Intranet acceleration system according to an exemplary embodiment.

An embodiment of the present application further provides a virtual Intranet acceleration system, at least including a server at an initiating end, a server at a receiving end, CPE at the initiating end and CPE at the receiving end, which are connected through a SD-WAN. The structure of the system is shown in FIG. 6.

Wherein, The CPE at the initiating end is configured to, upon receiving a TCP request sent from the server at the initiating end to the server at the receiving end, transmit information of the TCP request to the CPE at the receiving end.

The CPE at the receiving end is configured to configure a connection link between the server at the initiating end and the server at the receiving end according to the information of the TCP request received.

The server at the initiating end and the server at the receiving end are configured to transmit the TCP request and/or TCP response data through the connection link.

Wherein, The CPE at the initiating end may be configured to detect the TCP request, encapsulate the information of the TCP request sent from a server at a branch with a private protocol, and then send the encapsulated information to the CPE at the receiving end.

In the present application, the information of the TCP request contains at least the following information:

request data, an IP and a plurality of ports of the server at the receiving end configured as a Destination, and an IP and a plurality of ports of the server at the initiating end configured as a Source of the request.

Wherein, The connection link is carried on an SD-WAN reliable transmission channel between the CPE at the initiating end and the CPE at the receiving end.

Wherein, the CPE at the receiving end is configured to parse the information of the TCP request with the private protocol upon receiving the information of the TCP request; initiate a connection to the IP and ports of the server at the receiving end, and configure the IP and ports of the server at the receiving end as the Destination end; configure the IP and ports of the server at the initiating end as the Source end; and establish the connection link between the Destination end and the Source end.

An embodiment of the present application further provides a computer storage medium in which a computer program is stored. The steps of the virtual Intranet communication method provided by the embodiment of the present application are implemented when the program is executed by a processor.

An embodiment of the present application further provides a computer device, including a memory, a processor, and a computer program which is stored in the memory and may be operated in the processor. The steps of the virtual Intranet communication method provided by the embodiment of the present application are implemented when the computer program is executed by the processor.

An embodiment of the present application provides a virtual Intranet acceleration method and system, a configuration method, a storage medium and a computer apparatus. Upon receiving a TCP request sent from a server at an initiating end to a server at a receiving end, CPE at the initiating end transmits information of the TCP request to CPE at the receiving end. The CPE at the receiving end configures a connection link between the server at the initiating end and the server at the receiving end according to the information of the TCP request received, and then transmits the TCP request and/or TCP response data through the connection link. The connection link is established between the server at the initiating end and the server at the receiving end of an SD-WAN, and may be carried on a reliable transmission channel when transmitting the TCP request and/or TCP response data, so that transparency and acceleration of the TCP connection between the initiating end and the receiving end is achieved, and the transmission through the TCP connection is accelerated, which effectively avoids the packet loss and solves the problems of large resource consumption and poor effect of existing packet loss prevention methods.

The TCP connection is accelerated in the WAN-based virtual Intranet in a way that is imperceptible to customers, effectively solving the problem of application level sensing packet loss caused by packet loss in the virtual WAN.

Figure 7:
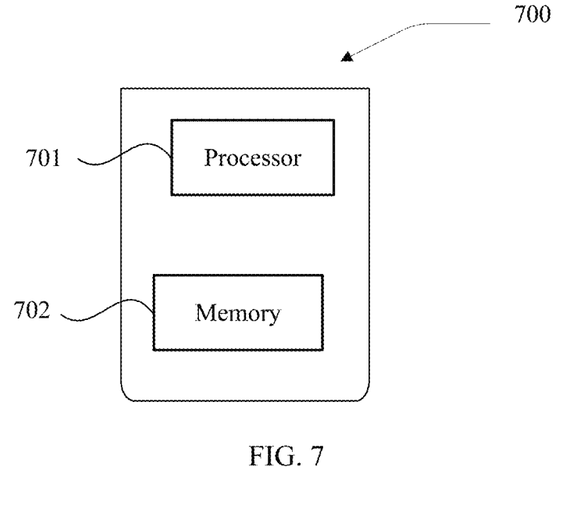
FIG. 7 is a block diagram of a computer apparatus according to an exemplary embodiment.

FIG. 7 is a block diagram of a computer equipment 700 for Intranet VPN acceleration according to an exemplary embodiment. For example, the computer equipment 700 may be provided as a server. Referring to FIG. 7, the computer equipment 700 includes a processor 701, and there may be one or more processors as required. The computer equipment 700 further includes a memory 702 configured to store instructions, such as applications, executable by the processor 701. There may be one or more memories as required, and there may be one or more applications stored therein. The processor 701 is configured to execute the instructions to perform the virtual Intranet acceleration method which includes following steps.

Upon receiving a TCP request sent from a server at an initiating end to a server at a receiving end, customer premise equipment (CPE) at the initiating end transmits information of the TCP request to CPE at the receiving end.

The CPE at the receiving end configures a connection link between the server at the initiating end and the server at the receiving end according to the information of the TCP request.

The TCP request and/or TCP response data is transmitted through the connection link.

It should be understood by those of skilled in the art that embodiments of the present application may be provided as methods, apparatuses (devices), or computer program products. Therefore, the present application may take the form of an entirely hardware embodiment, an entirely software embodiment, or an embodiment containing both hardware and software elements. Furthermore, the present application may take the form of a computer program product implemented on one or more computer usable storage media containing computer usable program codes therein. The computer storage medium includes volatile and nonvolatile, removable and non-removable media implemented in any method or technology for storing information (such as computer readable instructions, data structures, program modules or other data), including but not limited to RAM, ROM, EEPROM, flash memory or other memory technologies, CD-ROM, digital versatile disk (DVD) or other optical disk storage, magnetic cartridges, magnetic tapes, disk storage or other magnetic storage devices, or any other media that may be adopted to store desired information and may be accessed by a computer. Furthermore, it is well known to those of ordinary skilled in the art that communication media typically contain computer-readable instructions, data structures, program modules, or other data in modulated data signals such as carrier waves or other transmission mechanisms, and may include any information delivery media.

The present application is described with reference to flowcharts and/or block diagrams of the method, apparatus (device) and computer program product according to embodiments of the present application. It should be understood that each process and/or block in the flowchart and/or block diagram, and combinations of processes and/or blocks in the flowchart and/or block diagram may be implemented by computer program instructions. These computer program instructions may be provided to a processor of a general-purpose computer, a special-purpose computer, an embedded processor or other programmable data processing devices to produce a machine, such that the instructions executed by the processor of the computer or other programmable data processing devices produce a means for implementing the functions specified in one or more processes of the flowchart and/or one or more blocks of the block diagram.

These computer program instructions may also be stored in a computer-readable memory capable of directing a computer or other programmable data processing devices to operate in a specific manner, such that the instructions stored in the computer-readable memory produce an article of manufacture containing an instruction means that implements the functions specified in one or more processes of the flowchart and/or one or more blocks of the block diagram.

These computer program instructions may also be loaded onto a computer or other programmable data processing devices, such that a series of operational steps are performed on the computer or other programmable devices to produce a computer-implemented process, and the instructions executed on the computer or other programmable devices provide steps for implementing the functions specified in one or more processes of the flowchart and/or one or more blocks of the block diagram.

As used herein, the terms "including," "includes" or any other variation thereof are intended to cover non-exclusive inclusion, so that an article or device including a series of elements includes not only those elements, but also other elements not explicitly listed, or elements inherent to such an article or device. Without further limitation, the elements defined by the statement "including . . . " or "includes . . . " do not preclude the existence of additional identical elements in the article or device including the elements.

Although preferred embodiments of the present application have been described, those of skilled in the art may make additional alterations and modifications to these embodiments once they know the basic inventive concepts. Therefore, the appended claims are intended to be interpreted as including the preferred embodiments and all alterations and modifications that fall within the scope of the present application.

Obviously, those of skilled in the art may make various modifications and variations to the present application without departing from the spirit and scope of the present application. In this way, if these modifications and variations of the present application fall within the scope of the claims of the present application and their equivalent technologies, the intent of the present application encompasses these modifications and variations as well.

INDUSTRIAL APPLICABILITY

According to the technical scheme in the present application, upon receiving a TCP request sent from a server at an initiating end to a server at a receiving end, CPE at the initiating end transmits information of the TCP request to CPE at the receiving end. The CPE at the receiving end configures a connection link between the server at the initiating end and the server at the receiving end according to the information of the TCP request received, and then transmits the TCP request and/or TCP response data through the connection link. The connection link is established between the server at the initiating end and the server at the receiving end of an SD-WAN, and the TCP request and/or TCP response data is transmitted through the connection link. The connection link may also be carried on a reliable transmission channel, so that transparency and acceleration of the TCP connection between the initiating end and the receiving end is achieved, and the transmission through the TCP connection is accelerated, which effectively avoids the packet loss and solves the problems of large resource consumption and poor effect of existing packet loss prevention methods. The TCP connection is accelerated in the WAN-based virtual Intranet in a way that is imperceptible to customers, effectively solving the problem of application level sensing packet loss caused by packet loss in the virtual WAN.

The invention claimed is:
1. A virtual Intranet acceleration method comprising:
upon receiving a TCP request from a server at an initiating end to be sent to a server at a receiving end, customer premise equipment CPE at the initiating end transmitting information of the TCP request to CPE at the receiving end;

the CPE at the receiving end configuring a connection link between the server at the initiating end and the server at the receiving end according to the information of the TCP request; and transmitting at least one of the TCP request or TCP response data through the connection link;

wherein:

the server at the initiating end includes a branch server; and the CPE at the initiating end transmitting the information of the TCP request to the CPE at the receiving end includes:

the CPE at the initiating end detecting the TCP request; and the CPE at the initiating end encapsulating the information of the TCP request sent by the branch server with a private protocol to obtain encapsulated information, and sending the encapsulated information to the CPE at the receiving end through a port corresponding to the TCP request, the information of the TCP request including at least request data, an IP and a port of the server at the receiving end as a destination, and an IP and a port of the server at the initiating end as a source of the request.

2. The virtual Intranet acceleration method according to claim 1, wherein the CPE at the initiating end transmits the information of the TCP request to the CPE at the receiving end through a reliable Software-Defined Wide Area Network (SD-WAN) transmission mode.

3. The virtual Intranet acceleration method according to claim 1, wherein the CPE at the receiving end configuring the connection link according to the information of the TCP request includes:

the CPE at the receiving end parsing the information of the TCP request with the private protocol upon receiving the information of the TCP request;

initiating a connection to the IP and the port of the server at the receiving end, and configuring the IP and the port of the server at the receiving end as the destination;

configuring the IP and the port of the server at the initiating end as the source; and establishing the connection link between the destination and the source.

4. The virtual Intranet acceleration method according to claim 1, wherein the server at the initiating end includes a branch server, and the server at the receiving end includes a headquarters server.

5. The virtual Intranet acceleration method according to claim 1, wherein the server at the initiating end includes a headquarters server, and the server at the receiving end includes a branch server.

6. A non-transitory computer-readable storage medium storing a computer program that, when executed by a processor, causes the processor to perform the method according to claim 1.

7. A computer apparatus comprising:

a processor; and a memory storing a computer program that, when executed by the processor, causes the processor to perform the method according to claim 1.

8. A configuration method comprising:

receiving, by customer premise equipment (CPE) at a receiving end, information of a TCP request encapsulated with a private protocol and sent by CPE at an initiating end wherein:

a server at the initiating end including a branch server;

the TCP request is detected by the CPE at the initiating end; and the information of the TCP request is sent by the branch server and is encapsulated by the CPE at the initiating end with the private protocol to obtain encapsulated information, and the encapsulated information is sent to the CPE at the receiving end through a port corresponding to the TCP request, the information of the TCP request including at least request data, an IP and a port of a server at the receiving end as a destination, and an IP and a port of the server at the initiating end as a source of the request;

parsing, by the CPE at the receiving end, the information of the TCP request with the private protocol;

initiating, by the CPE at the receiving end, a connection to the IP and the port of the server at the receiving end;

configuring, by the CPE at the receiving end, the IP and the port of the server at the receiving end as a destination end;

configuring, by the CPE at the receiving end, the IP and the port of the server at the initiating end as a source end; and establishing, by the CPE at the receiving end, a connection link between the destination end and the source end.

9. A non-transitory computer-readable storage medium storing a computer program that, when executed by a processor, causes the processor to perform the method according to claim 8.

10. A computer apparatus comprising:

a processor; and a memory storing a computer program that, when executed by the processor, causes the processor to perform the method according to claim 8.

11. A virtual Intranet acceleration system comprising:

a server at an initiating end, including a branch server;

a server at a receiving end;

customer premise equipment (CPE) at the initiating end; and

CPE at the receiving end;

wherein:

the server at the initiating end, the server at the receiving end, the CPE at the initiating end, and the CPE at the receiving end are connected through a Software-Defined Wide Area Network (SD-WAN);

the CPE at the initiating end is configured to, upon receiving a TCP request from the server at the initiating end to be sent to the server at the receiving end, transmit information of the TCP request to the CPE at the receiving end;

the CPE at the receiving end is configured to configure a connection link between the server at the initiating end and the server at the receiving end according to the information of the TCP request; and the server at the initiating end and the server at the receiving end are configured to transmit at least one of the TCP request or TCP response data through the connection link;

wherein CPE at the initiating end is further configured to:
    detect the TCP request; and
    encapsulate the information of the TCP request sent by the branch server with a private protocol to obtain encapsulated information, and send the encapsulated information to the CPE at the receiving end through a port corresponding to the TCP request, the information of the TCP request including at least request data, an IP and a port of the server at the receiving end as a destination, and an IP and a port of the server at the initiating end as a source of the request.

12. The virtual Intranet acceleration system according to claim 11, wherein the connection link is carried on an SD-WAN reliable transmission channel between the CPE at the initiating end and the CPE at the receiving end.

13. The virtual Intranet acceleration system according to claim 11, wherein the CPE at the receiving end is further configured to: parse the information of the TCP request with the private protocol upon receiving the information of the TCP request; initiate a connection to the IP and the port of the server at the receiving end, and configure the IP and the port of the server at the receiving end as the destination; configure the IP and the port of the server at the initiating end as the source; and establish the connection link between the destination and the source.

14. The virtual Intranet acceleration system according to claim 11, wherein the server at the initiating end includes a branch server, and the server at the receiving end includes a headquarters server.

15. The virtual Intranet acceleration system according to claim 11, wherein the server at the initiating end includes a headquarters server, and the server at the receiving end includes a branch server.

* * * * *